(12) United States Patent
Appel

(10) Patent No.: US 11,660,938 B2
(45) Date of Patent: May 30, 2023

(54) SHADING DEVICE

(71) Applicant: WEBASTO SE, Stockdorf (DE)

(72) Inventor: Josef Appel, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 109 days.

(21) Appl. No.: 17/257,747

(22) PCT Filed: Jul. 3, 2019

(86) PCT No.: PCT/EP2019/067917
§ 371 (c)(1),
(2) Date: Jan. 4, 2021

(87) PCT Pub. No.: WO2020/007950
PCT Pub. Date: Jan. 9, 2020

(65) Prior Publication Data
US 2021/0170836 A1 Jun. 10, 2021

(30) Foreign Application Priority Data

Jul. 5, 2018 (DE) ...................... 10 2018 116 346.0

(51) Int. Cl.
*B60J 1/20* (2006.01)
*B60J 7/00* (2006.01)
(Continued)

(52) U.S. Cl.
CPC ........... *B60J 1/2016* (2013.01); *B60J 1/2019* (2013.01); *B60J 7/0015* (2013.01); *B60J 7/0573* (2013.01);
(Continued)

(58) Field of Classification Search
CPC ...... B60J 1/2016; B60J 1/2019; B60J 1/2052; B60J 1/2025; B60J 1/2044; B60J 7/0015;
(Continued)

(56) References Cited

U.S. PATENT DOCUMENTS

| 2005/0061454 A1 | 3/2005 | Chen | |
| 2007/0000624 A1* | 1/2007 | Hansen | ...................... E06B 9/88 |
| | | | 160/370.22 |

(Continued)

FOREIGN PATENT DOCUMENTS

| DE | 10057762 A1 | 6/2002 |
| DE | 202006017837 U1 | 2/2007 |

(Continued)

OTHER PUBLICATIONS

PCT International Search Report and Written Opinion, PCT/EP2019/067917, dated Nov. 12, 2019, 18 pages.

*Primary Examiner* — Dennis H Pedder
*Assistant Examiner* — Joyce Eileen Hill
(74) *Attorney, Agent, or Firm* — Quarles & Brady LLP

(57) ABSTRACT

A shading device for a vehicle roof includes at least one shading length that can be rolled up for shading a light-permeable and/or open area of the vehicle roof, a tension bow that is movably mounted in a direction of travel (V), to which the shading length-is fastened, a drive mechanism that can be operated by a drive motor to move the tension and a control unit for activating the drive motor. The shading device includes at least one opposing force element for restricting a traveling movement of the tension bow, and the control unit is designed to activate the drive motor based on an opposing force when the tension bow reaches an end position (P1, P2) defined by the stop element.

19 Claims, 3 Drawing Sheets

(51) Int. Cl.
*B60J 7/057* (2006.01)
*B60J 7/043* (2006.01)
*E05F 15/41* (2015.01)
*E06B 9/68* (2006.01)

(52) U.S. Cl.
CPC .............. *B60J 1/2044* (2013.01); *B60J 7/043* (2013.01); *E05F 15/41* (2015.01); *E06B 2009/6854* (2013.01)

(58) Field of Classification Search
CPC ... B60J 7/0573; B60J 7/057; B60J 7/06; B60J 7/043; B60J 7/12; B60J 7/1204; E05Y 2900/542; E05Y 2900/55; E05Y 2400/554; E06B 9/56; E06B 9/68; E06B 9/72; E06B 9/70; E06B 9/88; E06B 9/82; E06B 2009/6809; E06B 2009/6818; E06B 2009/6854; E05F 15/41; G05B 15/00; G05B 15/02; G05B 2219/2653
USPC ...... 296/211, 222, 223, 216.07, 216.08, 214, 296/98
See application file for complete search history.

(56) References Cited

U.S. PATENT DOCUMENTS

| | | | |
|---|---|---|---|
| 2009/0101291 A1* | 4/2009 | Kriese | B60J 1/2086 160/310 |
| 2011/0042016 A1 | 2/2011 | Demma | |
| 2013/0106144 A1* | 5/2013 | Nagase | B60J 7/0015 296/223 |
| 2014/0081513 A1* | 3/2014 | Mankame | B60J 7/022 701/34.4 |
| 2015/0360545 A1* | 12/2015 | Nania | B60J 7/06 296/223 |
| 2017/0218699 A1 | 8/2017 | Mugnier | |

FOREIGN PATENT DOCUMENTS

| | | |
|---|---|---|
| EP | 2270301 A2 | 1/2011 |
| GB | 2472900 A | 2/2011 |

\* cited by examiner

SHADING DEVICE

CROSS-REFERENCE TO RELATED APPLICATIONS

This application is the national stage application of International Patent Application No. PCT/EP2019/067917 filed on Jul. 3, 2019, which application claims priority to German Patent Application DE 10 2018116 346.0 filed on Jul. 5, 2018, which applications are hereby incorporated by reference in their entirety.

DESCRIPTION

The present disclosure relates to a shading device, in particular a sunscreen roller blind, for a vehicle roof, to a roof arrangement, in particular a sliding/lifting roof arrangement having a shading device of this kind, and to a control method for a shading device or a roof arrangement having a shading device.

Roofs of motor vehicles are frequently light-permeable or openable in areas, in order to allow sunlight or fresh air into the inside of the vehicle. Glazed roof areas or adjustable roof elements are frequently provided for this purpose, for example tiltable and/or movable glass elements are fitted into a roof opening of the vehicle roof. Roof arrangements of this kind are known as lifting roofs, lifting/sliding roofs, integrated lifting/sliding roofs, panoramic roofs or folding roofs. In order to prevent unpleasant or dazzling direct sunlight from affecting passengers, roller blinds are fitted below the glazed roof areas or the roof opening to provide shade. Sunscreen roller blinds of this kind may be manually adjustable or operable by means of an electric motor. Multiple roller blinds can be provided for roof arrangements with multiple glass elements, e.g. for panoramic roofs with two glass elements.

A controlled electric motor moves the sunscreen roller blind between the two end positions or into an intermediate position, in order to adjust the shading as required. Following a corresponding traveling movement, the drive motor is not further operated by the control system or is switched off. Precise control of the roller blind drive or the roller blind position is necessary, particularly in order to prevent a chink of light from remaining when the roller blind is in the closed end position, and to ensure sufficient shade.

Different methods for driving and controlling sunscreen roller blinds are known from the prior art. A roller blind can be provided with its own roller blind drive with an associated control system. In this case, two separate control systems are used for the roller blind and the adjustable roof element. The roller blind drive can also be jointly controlled by the control system of an adjustable roof element. In this case, the rotational position of the roller blind drive is detected by means of Hall sensors and transmitted to the control system of the roof element via additional lines. By means of the rotational position of the roller blind drive, the position of the roller blind is then determined. A corresponding sensor system with a magnetic wheel sensor and an intricate run of lines is required. Alternatively, it is known in the art for current fluctuations (ripple current) produced by the commutation of the electric motor of the roller blind drive to be detected or counted (ripple counting) and used to determine the position of the roller blind drive. This necessitates intricate signal processing and a restriction to certain suitable motors is required. The control systems for sunscreen roller blinds which are known in the art have the disadvantage that they are elaborate and expensive in terms of the parts needed or components used and the installation thereof.

The problem addressed by the disclosure is therefore that of providing a shading device and a roof arrangement for vehicle roofs and a control method for a shading device which have a simpler design or are easier to implement. In particular, the shading device should be capable of being produced from fewer or simpler components and should be easier to fit into a vehicle roof. In this way, a more cost-effective shading device or roof arrangement, in particular, should be obtained.

This problem is solved by a shading device as claimed in claim 1, a roof arrangement as claimed in claim 10, and by a control method as claimed in claim 13.

In particular, the problem is solved by a shading device, in particular a sunscreen roller blind, for a vehicle roof, comprising:

- at least one shading length that can be rolled up for shading a light-permeable and/or open area of the vehicle roof,
- a tension bow that is movably mounted in a direction of travel, to which tension bow the shading length is fastened,
- a drive mechanism that can be operated by a drive motor, said drive mechanism being designed to move the tension bow back and forth between a first end position in which the shading length is rolled up (in particular, completely or at least further than in the second basic position introduced subsequently) and a second end position in which the shading length is unrolled at least partially,
- a control unit for activating the drive motor, characterized in that the shading device comprises at least one opposing force element, in particular a stop element, for restricting a traveling movement of the tension bow, wherein the control unit is designed to activate, in particular to switch off, the drive motor based on an opposing force, in particular a stop force, and/or a drive torque of the drive motor, when the tension bow reaches an end position defined by the opposing force element.

The idea underlying the disclosure is that a shading device for vehicle roofs can be controlled on the basis of an opposing force, in particular a stop force, or drive torque, rather than being controlled—at least not exclusively—based on the position (rotational position) of the drive motor, as is known from the prior art. To this extent, a shading device according to the disclosure may be referred to as force-controlled or torque-controlled. According to a more general idea of the disclosure, the control unit may be alternatively or additionally designed to activate the drive motor based on a motor current of said drive motor when the tension bow reaches an end position defined by the opposing force element (stop element). Unlike in the prior art, the shading device according to the disclosure preferably does not comprise a position sensor which is separate from, or integrated in, the drive motor, in particular no Hall sensor, and does not perform any ripple counting.

In particular, the control unit is designed, based on an opposing force, in particular a stop force, and/or a drive torque of the drive motor, to determine whether the tension bow has reached the end position, in order to activate, preferably to switch off (disconnect from a supply voltage), the drive motor as a result of this. In particular, the control system restricts the opposing force (stop force) or the drive torque. An opposing force (stop force) or a drive torque can be measured, for example by a force sensor or a torque sensor, or determined (calculated), in particular based on operating parameters of the drive motor. In particular, an increase in the opposing force (stop force) or the drive torque indicates indirect or direct contact between the tension bow and the opposing force element (stop element), from which it can be inferred that the end position has been reached.

The control unit may be integrated in the drive motor, in particular in a housing of the drive motor, or be connected to the drive motor (electrically) as a separate control unit (control device). In particular, the control unit comprises an (electronic) control circuit which preferably comprises at least one processor (microcontroller) and/or at least one relay for switching the drive motor on/off or reversing the polarity thereof. The drive motor is, in particular, an electric motor, preferably a DC motor.

The shading device may comprise multiple shading lengths, in particular for shading various light-permeable and/or open areas of the vehicle roof, e.g. a panoramic roof. The control unit may be designed to activate multiple drive motors or a joint drive motor for the (independent) movement of multiple shading lengths. In particular, a shading device may comprise and control multiple sunscreen roller blinds.

In the first end position of the tension bow, the light-permeable and/or open area of the vehicle roof is preferably not shaded, while in the second end position of the tension bow it is preferably completely shaded. By means of the control system or the drive mechanism, intermediate positions of the tension bow between the first and second end position can, in particular, be set, in order to achieve partial shading.

The at least one opposing force element, in particular a stop element, is particularly arranged in such a manner that the tension bow comes into contact directly or indirectly with the opposing force element (stop element) or strikes against it. In particular, a stop face of the stop element forms an end stop for a stop face of the tension bow. An opposing force element (stop element) for restricting the traveling movement of the tension bow in the first and/or second end position can be provided in each case, wherein the position of the opposing force element defines the first and/or second end position in particular. Opposing force elements (stop elements) for restricting the traveling movement at one or both of the end positions allow activation, in particular switching-off, of the drive motor based on an opposing force (stop force) or a drive torque when the shading length is (completely) unrolled or (completely) rolled up. In particular, the drive motor may be switched off, although a user operates an operating element (switch for the sunscreen roller blind) for the drive mechanism.

An opposing force may be understood to mean an (instantaneous) contact force between the opposing force element and the tension bow, wherein the contact force can also be indirectly transferred to the tension bow. An opposing force element may be each element that causes a (significant) increase in the drive force or drive torque. The opposing force element is preferably configured as a stop element. However, it can also be realized by a point of resistance, e.g. an elastically deformable opposing force element or a narrowing or elevation in a guide rail, to be overcome by the drive during the traveling movement. The opposing force (stop force) is, in particular, zero when the tension bow is not in contact with the opposing force element (stop element) (e.g. in an intermediate position). A drive torque may be understood to mean the (instantaneously) exerted drive torque (torque) of the drive motor. In particular, the drive torque increases when there is (indirect) contact between the tension bow and the stop element (i.e. when the drive motor has stopped). In this case, the tension bow exerts a stop force on the stop element, either directly or indirectly, which corresponds to the drive torque.

"Activation" may be understood to mean the implementation of a switching action or the emitting of a control signal. For example, the control unit (control circuit) can operate a relay by means of a control signal that is produced. In particular, the drive motor can be switched on or off by the control unit, in that a supply voltage, or no supply voltage, (battery voltage of the vehicle) is applied or a motor connection is earthed.

In the case of a shading device according to the disclosure with a control system based on an opposing force, in particular a stop force, or a drive torque of the drive motor, position sensors can be dispensed with. This means that the shading device comprises fewer components, has a simpler design, and can be produced more cost-effectively. A shading device as described can be used for different traveling paths, i.e. for different vehicle roofs, since the control unit or control system works based on the opposing force or the drive torque and is therefore independent of the concrete dimensions (length) of the shading device. This makes retrofitting a shading device, in particular, simpler.

In a preferred embodiment of the disclosure, the opposing force element, in particular the stop element, defines the second end position, wherein the shading length preferably shades the light-permeable and/or open area of the vehicle roof completely in the second end position of the tension bow. Two opposing force elements (stop elements) can be arranged on both sides of the tension bow, preferably at the same height in the direction of travel. In particular, stop elements for limiting the direction of travel at the second end position allow an activation, in particular a switching-off, of the drive motor based on a stop force or a drive torque when the shading length is unrolled (to the maximum).

In one embodiment of the disclosure, the opposing force element is configured as a stop element which is arranged at one end of a lateral guide which guides the tension bow in the direction of travel. A stop element may be arranged in a guide rail of the lateral guide in which the tension bow is guided, preferably on both sides, for example in the form of (inserted) stop blocks or (fitted) stop caps. A lateral guide increases the stability of the shading device. The stop element may be fastened to, or in, a lateral guide in a structurally simple manner.

In one embodiment of the disclosure the control unit is designed to activate the drive motor based on an opposing force, in particular a stop force, and/or a drive torque of the drive motor, in such a manner that the drive direction of the drive motor reverses when the tension bow reaches an end position defined by the opposing force element, in particular the stop element, in particular in order to bring about a load-relief movement of the tension bow. In particular, the polarity of the drive motor can be reversed by the control unit when the end position is reached, in particular in order to produce a (slight) reverse movement. The drive motor is preferably switched off by the control system following the reverse movement. A reversal of the drive direction may be provided during a (short) predetermined reversal or load-relief interval. Through a (small) reverse movement, the drive mechanism is relieved of the opposing force (stop force) or the drive torque, while the end position of the tension bow is preferably not changed substantially. In particular, a reverse movement causes there to be a (slight) clearance between the opposing force element (stop element) and the tension bow. In this way, the opposing force (stop force) or the drive torque can be limited. The load for the drive mechanism is thereby reduced.

In one embodiment of the disclosure, the control unit is designed to detect a motor current of the drive motor and to determine a drive torque of the drive motor based on the motor current detected. The motor current may be understood to mean the current (armature current) which is flowing through the drive motor at the present time. In particular, the motor current increases when there is (indirect) contact between the tension bow and the opposing force element or stop element (i.e. when there is resistance for the drive motor, in particular when the drive motor has stopped). The motor current or armature current can be determined by means of a measuring resistor of the control unit. In particular, determining can be understood to mean a calculation or estimation. The control unit can determine a drive torque based on a saved characteristic curve of the motor, preferably a drive torque/motor current characteristic curve, and/or based on a saved formula, in particular based on a (linear) proportionality between the motor current (armature current) and the drive torque (torque) (by means of a saved constant, in particular a proportionality constant, e.g. a motor parameter). In this way, the drive torque can be determined as a suitable control parameter (influencing variable or control criterion), namely without the position being detected by a position sensor. The motor current and the drive torque of the drive motor increase (during application of the supply voltage), when the drive motor has to overcome resistance due to the opposing force element or comes to a standstill due to a stop element. Through the simple detection of the motor current by measuring means and the simple determination of the drive torque from this, control of the shading device can be realized by simple components. In particular, there is no need for a complex electronic diagnostic system for voltage fluctuations or a ripple current. In particular, intricate cabling for Hall sensors between the drive mechanism, in particular the drive motor, and a (central) control unit can be dispensed with.

In one embodiment of the disclosure, the control unit is designed to compare a determined drive torque with a predetermined limit drive torque and possibly (optionally) to switch off the drive motor or to reverse the drive direction of the drive motor if the drive torque which is determined exceeds the limit drive torque. The predetermined limit drive torque represents, in particular, represents a threshold value for the detected drive torque which indicates that the end position defined by the stop element has been reached. The limit drive torque may be understood as a (variably adjustable) fixed threshold value (stop torque) for a maximally permitted drive torque, the reaching or passing of which implies that the tension bow has reached the end position. To this extent, the limit drive torque could also be referred to as a limited stop torque.

The limit drive torque could, for example, be 1.1 to 3 times, preferably 1.2 to 2 times, more preferably 1.2 to 1.5 times, a rated drive torque or the drive torque during a traveling movement of the tension bow. In particular, the control unit reads out a value stored in a storage unit for the predetermined limit drive torque. The storage unit could also include an electronic comparison circuit (comparator). By comparing the drive torque with a predetermined limit drive torque, it is easy to determine whether the tension bow has reached the end position. A positional determination by a position sensor can be dispensed with.

As an alternative or in addition to the determination of a drive torque, a detected motor current could also be (directly) compared with a predetermined limit motor current, in order to switch off the drive motor or reverse the drive direction of the drive motor if the motor current exceeds the limit motor current. In this way, a step for determining or calculating a drive torque from the motor current can be dispensed with.

In one embodiment of the disclosure, the control unit is designed to determine a limit drive torque from previous traveling movements of the tension bow, in particular from recorded time profiles of the motor current and/or the drive torque. In particular, the control unit can determine the limit drive torque based on an increase in the drive torque over time during a previous traveling movement, the associated motor current profile or drive torque profile whereof is stored in a storage unit. The control unit preferably implements an evaluation function of previous traveling movements.

In one embodiment of the disclosure, the limit drive torque is intended to be smaller than, or equal to, an anti-trap protection torque for protecting a human body part from becoming trapped by the traveling movement of the tension bow. This means that a separate anti-trap protection mechanism for the shading device can be dispensed with.

In a possible embodiment of the disclosure, the control unit is designed to detect a travel time of the tension bow and, based on the detected travel time, in particular based on a rated speed of the drive motor, to calculate or estimate a position of the tension bow. This calculated position can also be used in controlling the shading device, for example in order to check the plausibility of a drive torque detected for a particular point in time. However, there is no need for the position to be detected by means of separate position sensors.

In one embodiment of the disclosure, the stop element and/or the tension bow include(s) a force sensor in order to detect a stop force. The control unit is particularly connected to the force sensor and, in particular, designed to evaluate a detected stop force, and preferably to compare it with a predetermined limit stop force. A force sensor may be simpler than a Hall sensor, for example.

In particular, the problem is furthermore solved by a roof arrangement, in particular a sliding and/or lifting roof arrangement, for a vehicle roof, comprising a shading device according to the disclosure, wherein the roof arrangement includes a roof element that can be adjusted by a motor, in particular a light-permeable roof element, for covering a roof opening in the vehicle roof, a roof adjustment mechanism for adjusting, in particular moving and/or lifting, the roof element, wherein the control unit is designed to activate the roof adjustment mechanism of the roof element.

In particular, the roof adjustment mechanism and the shading device can be controlled by a joint control unit, wherein the control unit is preferably connected to the roof adjustment mechanism and the drive mechanism of the shading device or to the drive motor (via electrical lines). The roof element is preferably designed to be light-permeable, for example as a glass roof. The roof opening is, in particular, a light-permeable and/or open area of the vehicle roof. The roof adjustment mechanism may have its own drive motor or be operated by means of the drive motor of the shading device. A roof arrangement of this kind has the advantage that no additional control unit for adjustment of the roof element or of the shading device has to be provided. A control unit provided for the roof adjustment mechanism or the shading device can be jointly used for the other component in each case. The retrofitting capability of a shading device for a roof arrangement already installed in a vehicle is also improved.

In one embodiment of the disclosure, the roof adjustment mechanism can be operated by a drive motor, wherein a drive motor for the shading device and the drive motor for the roof adjustment mechanism are connected to the control unit. The two drive motors (for the shading device or the roof adjustment mechanism) can be arranged together on one circuit board (printed circuit board) or on separate circuit boards.

In one embodiment of the disclosure, the control unit has a plug-type connection by means of which said control unit can be connected to the drive motor. In this way, a drive motor for the shading device can easily be attached to a control unit (existing or built-in). The simple method of controlling the shading device according to the disclosure means that an existing control unit need not be designed for complex additional functions for controlling said shading device. In particular, the retrofitting capability and the ability to fit a shading device (a sunscreen roller blind) are made easier by a plug-type connection of the control unit.

The problem is furthermore solved, in particular, by a control method for a shading device, in particular a shading device according to the disclosure, or for a roof arrangement having a shading device, in particular a shading device according to the disclosure, for a vehicle roof, wherein the control method comprises the following steps:

operation of a drive mechanism by activating a drive motor by means of a control unit, in order to move a tension bow of a shading device back and forth between a first end position and a second end position, wherein a shading length that can be rolled up and is fastened to the tension bow for shading a light-permeable and/or open area of the vehicle roof is rolled up in the first end position and at least partially unrolled in the second end position;

determination of an opposing force, in particular a stop force, and/or a drive torque of the drive motor, when the tension bow reaches an end position defined by at least one opposing force element, in particular a stop element, wherein the opposing force element limits a traveling movement of the tension bow;

activation, in particular switching-off, of the drive motor by the control unit based on the opposing force which is determined and/or the drive torque of the drive motor which is determined.

The method has similar advantages to those already been described in connection with the shading device according to the disclosure and the roof arrangement. The method can be implemented by the shading system according to the disclosure or the roof arrangement, in particular by the control unit which has been described. In particular, the control unit produces control signals or commands which correspond to the process steps. Furthermore, a computer-readable store with instructions for implementing the described method can be provided which can be read out by the control unit, in particular. The control method can implement individual, or all, features of the method which have been described in connection with the shading device and the roof arrangement.

In one embodiment of the disclosure, the control method furthermore involves activation of the drive motor for reversing the drive direction of the drive motor, based on the opposing force which has been determined, in particular the stop force, and/or the drive force of the drive motor which has been determined, in particular in order to bring about a load-relief movement of the tension bow. In particular, the control method can activate the drive motor in such a manner that its poles are (briefly) reversed, in particular during a (brief) load-relief interval, in order to carry out a reverse movement. In this way, the drive mechanism can be load-relieved in an end position of the tension bow.

In one embodiment of the disclosure, the control method furthermore involves the detection of a motor current of the drive motor when the tension bow reaches the end position defined by the stop element, and determination of a drive torque of the drive motor based on the motor current detected. In particular, the control method involves comparing the drive torque which has been determined with a predefined limit drive torque, wherein the drive motor is, in particular, switched off or activated in order to reverse the drive direction if the drive torque that has been determined exceeds the limit drive torque.

Exemplary embodiments of the disclosure are explained in greater detail below with the help of the drawings. In the drawings.

In the following description of the disclosure, the same reference numbers are used for elements which are the same and have the same action.

Figure 1:
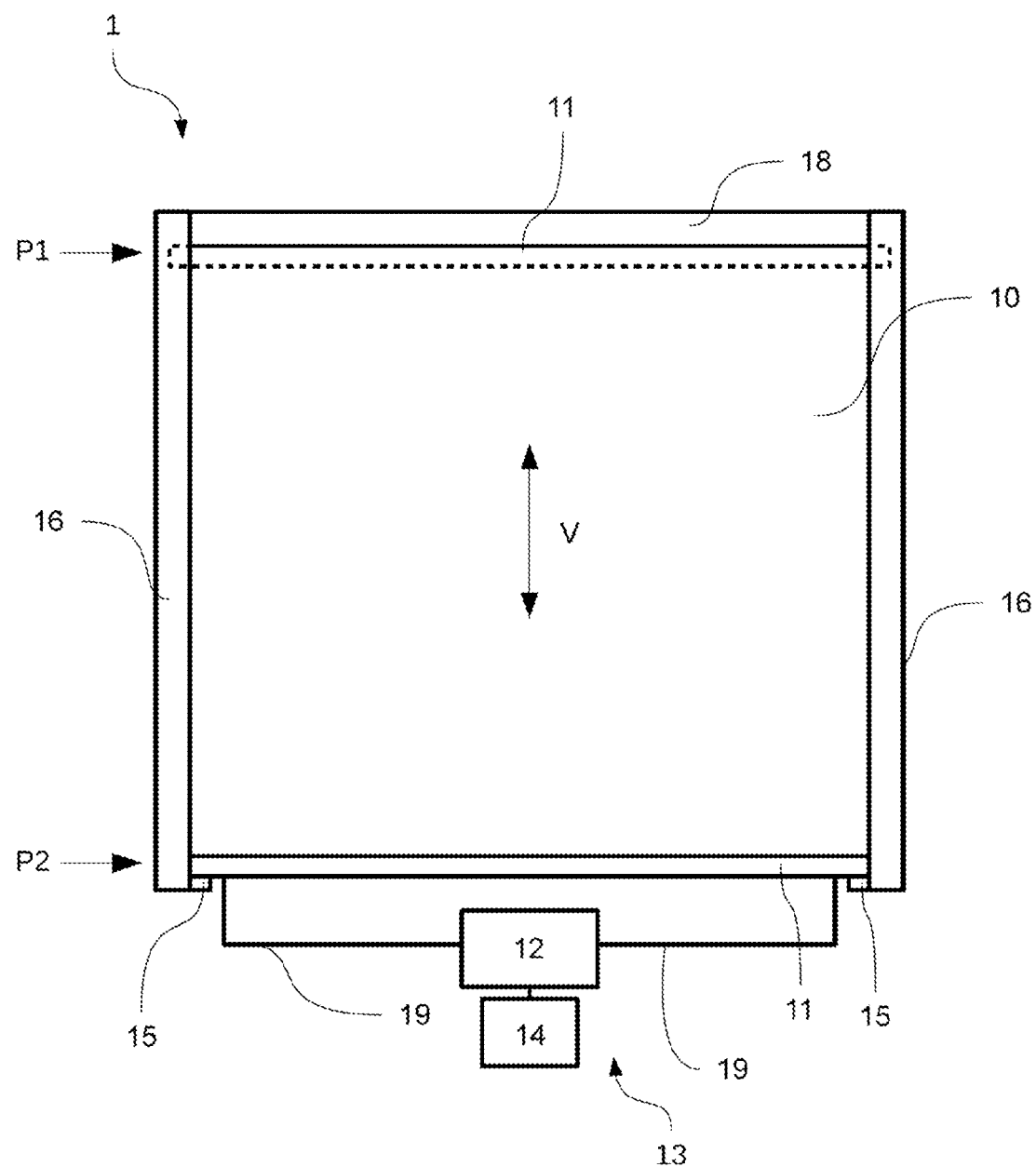
FIG. 1 shows a schematic representation of an embodiment of a shading device according to the disclosure in plan view.

FIG. 1 shows a shading device 1 according to the disclosure for a vehicle roof 2 (not shown) which is designed as a sunscreen roller blind. The shading device 1 comprises a shading length 10 that can be rolled up, in particular a roller blind, made of a flexible, light-permeable material which is fastened to a tension bow 11 at one end. The tension bow 11 is mounted displaceably in lateral guides 16 along the direction of travel V. The other end of the shading length 10 is fastened to a winding shaft 18 and can be rolled up on said shaft. The tension bow 11 runs transversely to the shading length 10, namely perpendicularly to the direction of travel V. Alternatively, the tension bow 11 could also be configured as the displaceably mounted winding shaft 18, wherein the end of the shading length 10 lying opposite the tension bow 11 would be fastened to a fixed bow or crossbeam. The winding shaft 18 is pretensioned in the unrolling direction, wherein the tension bow 11 draws the shading length against a pretensioning force when unrolling 10.

The tension bow 11 can be moved in the direction of travel V by means of a drive mechanism 13 with a drive motor 12, which is designed as a DC electric motor, between a first end position P1 and a second end position P2, wherein intermediate positions are also possible. In the first end position P1 (tension bow shown as a dotted line) the shading length 10 is substantially completely rolled up on the winding shaft 18, so that a light-permeable or open area of the vehicle roof 2 is not shaded, while in the second end position P2 the shading length 10 is unrolled and a preferably complete shading is achieved.

The drive motor 12 operates the drive mechanism 13 in order to produce a traveling movement of the tension bow 11 and is controlled or activated, i.e. in particular switched on, switched off, or commutated, by the control unit 14. The drive mechanism 13 comprises (compression-resistant)

drive cables 19, as are known per se for lifting and/or sliding roofs. The control unit 14 controls the traveling movement of the drive mechanism 13 or tension bow 11 specified by a user, in particular vehicle passengers, by means of an operating element. The drive motor 12 should be switched off in this case, i.e. a voltage supply of the drive motor 12 is interrupted when the tension bow 11 has reached one of the two end positions P1 or P2.

According to the disclosure, the shading device 1 comprises one or multiple opposing force elements 15 which are configured as stop elements in this case. The stop elements 15 are arranged on both sides at the ends of the lateral guides 16. In the second end position P2 the tension bow 11 strikes the stop element 15 directly, i.e. comes into contact with the stop element 15, wherein an indirect impact (contact) by the tension bow 11 or an opposing force exerted on the tension bow in some other way is conceivable. To this extent, the stop elements 15 define the second end position P2 which limits the traveling movement of the tension bow 11 or of the drive mechanism 13. Alternatively or in addition, one or more stop elements 15 could be provided on the side of the winding shaft 18 in order to define the first end position P1. Stop elements 15 could also be arranged in the center or be integrally formed in the lateral guides 16.

The control unit 14 is designed to detect or monitor a motor current of the drive motor 12. The tension bow 11 is moved in a force-limited manner between the two end positions P1, P2, as a result of which a relatively gentle impact at the stop elements 15 is achieved. In this way, irritating noises produced when the end positions P1, P2 are reached can be avoided. When the tension bow 11 reaches the second end position P2 and strikes the stop elements 15, i.e. comes to a standstill, the motor current or the drive torque increases. The drive torque can be determined, in particular calculated, from the detected motor current, for example by means of a proportional correlation between the motor current and the drive torque or by means of a motor characteristic curve of the drive motor 12. Because the control unit 14 detects the rise in the motor current or drive torque, and compares it with a predetermined limit drive torque, the control unit 14 can identify that the tension bow 11 has reached the second end position P2. A similar method can be implemented in relation to the first end position P1. To this extent, no positional determination by means of position sensors is required according to the disclosure, in order to determine the position of the tension bow or of the shading length 10 and activate the drive motor 12 accordingly, in particular switch it off.

The control unit 14 may be designed to activate, i.e. to commutate, the drive motor 12 when an end position P1, P2 is reached, in such a manner that its drive direction is reversed for a short time, in particular during a predefined load-relief interval. In this way, a (small) reverse movement can be initiated in order to relieve the drive mechanism 13 before the drive motor 12 is switched off.

Figure 2A:
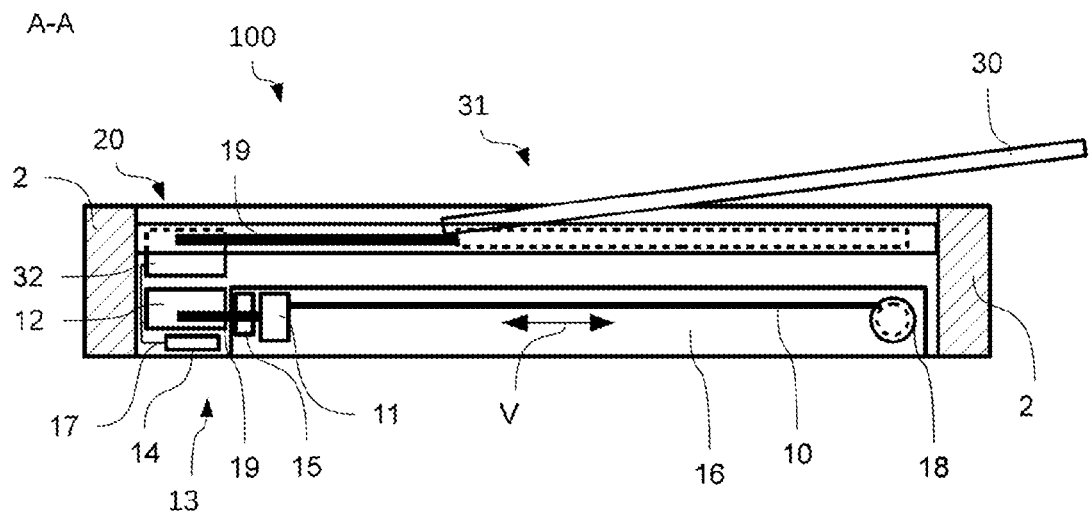
FIG. 2A shows a schematic representation of an embodiment of a roof arrangement according to the disclosure with a shading device in a sectional side view.
Figure 2B:
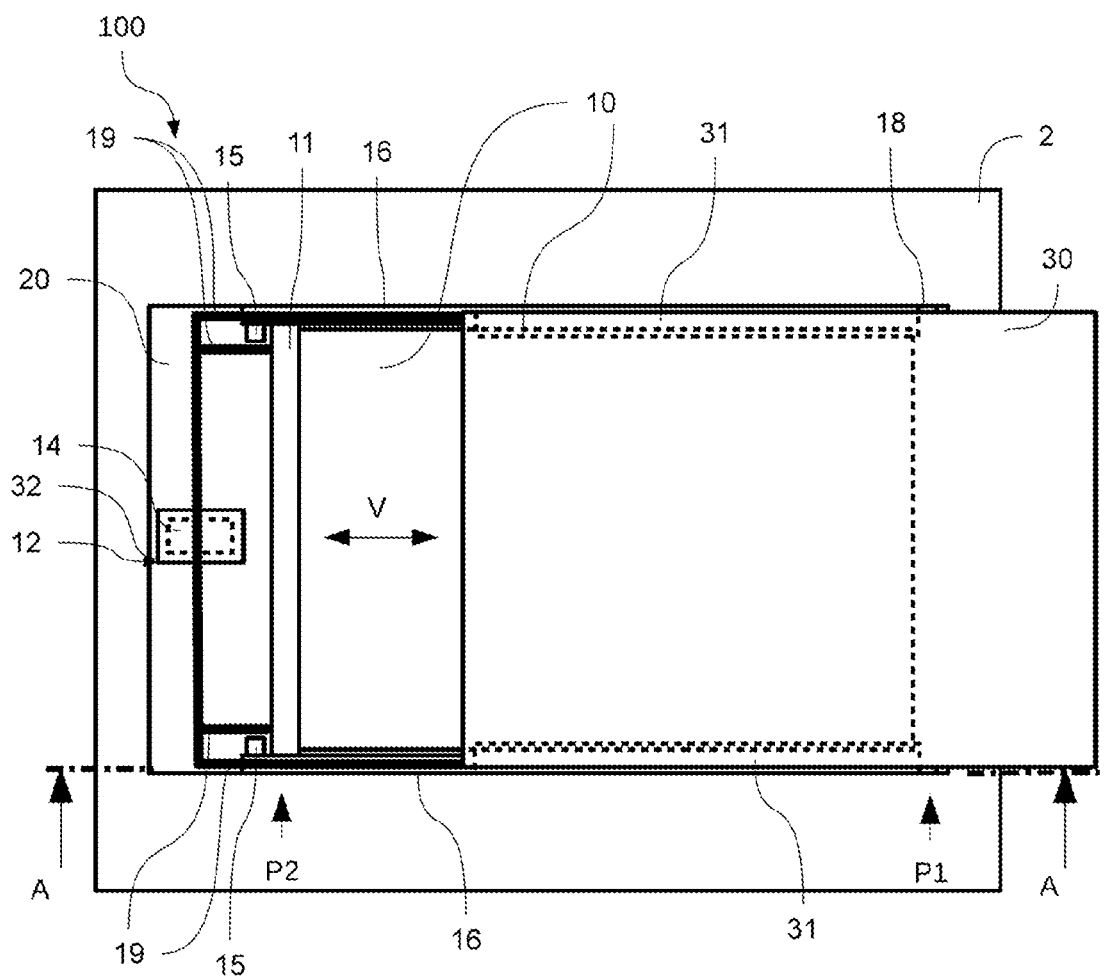
FIG. 2B shows a schematic representation of the embodiment according to FIG. 2A in plan view.
Figure 3:
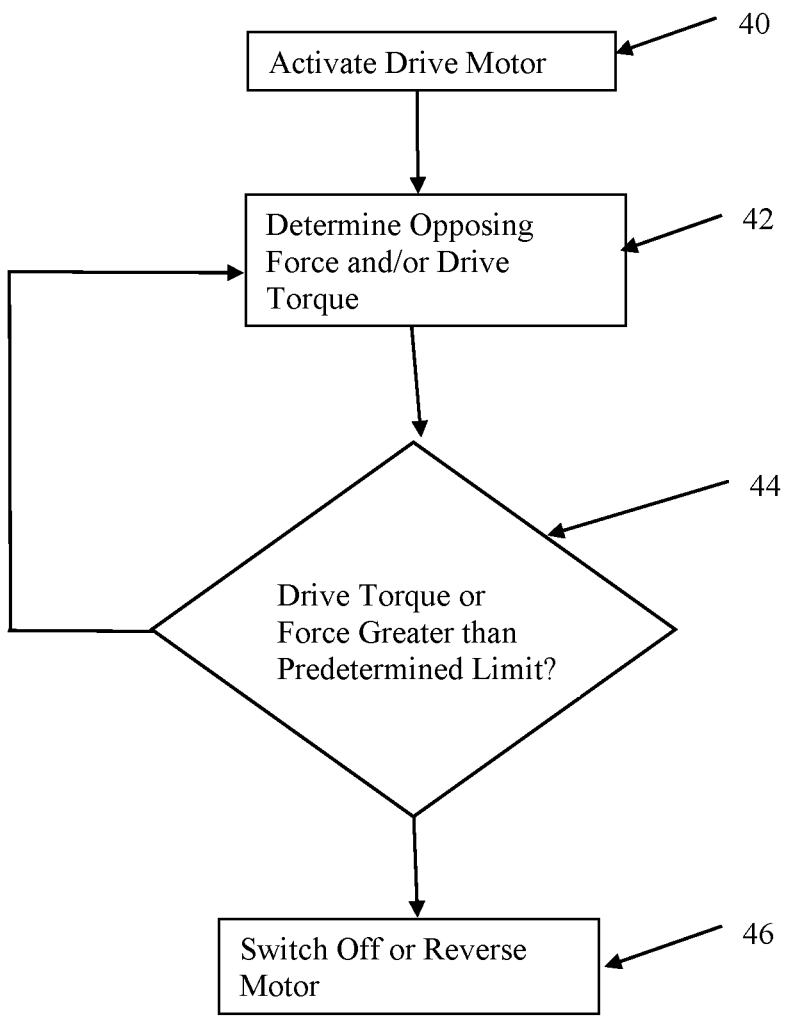
FIG. 3 is a block diagram of a control method according to the disclosure.

FIGS. 2A and 2B show an embodiment of a roof arrangement 100 according to the disclosure, in this case a lifting/sliding roof, for a vehicle roof 2 which includes a shading device 1 according to the disclosure, the function of which is described in connection with FIG. 1. The shading device 1 is used to shade a roof opening 20 which can be covered by a roof element 30 that can be adjusted by a motor via a roof adjustment mechanism 31. The roof element 30 is typically configured as a glass roof. The roof adjustment mechanism 31 and the shading device 1 are operated by means of separate drive motors 32 and 12 which each drive or adjust (compression-resistant) drive cables 19 known per se which are coupled or connected to the roof element 30 or the tension bow 11. The two drive motors 12, 32 can be arranged on one or two circuit board(s) and provided in a joint housing or in separate housings. The control unit 14 is connected to the drive motor 12 by means of a plug-type connection 17. A further plug-type connection is provided for the drive motor 32. By activating the drive motor 12, the control unit 14 can operate the roof-adjustment mechanism 31 and the drive mechanism 13. In principle, however, joint drives or drive motors could also be provided for operation of the roof adjustment mechanism 31 and the drive mechanism 13. The simple nature of the control system of the shading device 1 based on an opposing force, in particular a stop force, or a drive torque, means that a control unit 14 already provided for adjustment of the roof element 30 can be jointly used for the shading device 1, without complex control functions having to be implemented.

A control method according to the disclosure implements the functions of the control unit 14 described in connection with the shading device 1 and the roof arrangement 100 and performs corresponding method steps. The control method can include, for example, activating a drive motor to operate a drive mechanism moving a tension bow of a shading device back and forth between a first end position (P1) in which the shade is rolled up and a second end position (P2) in which the shade is at least partially unrolled (step 40); determining an opposing force and/or a drive torque of the drive motor when the tension bow reaches an end position (P1, P2) defined by at least one opposing force element (step 42), and switching off or reversing the drive motor (step 46) if the drive torque that has been determined exceeds the predetermined limit drive torque (step 44).

The shading device 1 according to the disclosure, the roof arrangement 100 according to the disclosure, and the control method according to the disclosure are easy to build or implement. In particular, it is possible to control a shading device more easily and cost-effectively than in the prior art. A(n) (explicit) positional detection by position sensors can be dispensed with. The same shading device 1 can be used for different method paths, i.e. in particular different vehicle roofs, since it is automatically adapted to the correct travel path by the control system via the opposing force (stop force) and/or the drive torque.

It should be noted at this point that all aspects of the disclosure described above, viewed in isolation and in any combination, in particular the details depicted in the drawings, are claimed as essential to the disclosure. The same applies to the method steps explained. Modifications thereto are familiar to the person skilled in the art.

LIST OF REFERENCE NUMBERS 1 shading device
2 vehicle roof
10 shading length, in particular roller blind
11 tension bow
12 drive motor
13 drive mechanism
14 control unit
15 opposing force element, in particular stop element
16 lateral guide
17 plug-type connection
18 winding shaft
19 (compression-resistant) drive cable
20 roof opening
30 roof element, in particular glass roof
31 roof adjustment mechanism 32 drive motor
100 roof arrangement
V direction of travel

The invention claimed is:

1. A shading device for a vehicle roof, comprising:
    at least one shading length that can be rolled up for shading a light-permeable and/or open area of the vehicle roof,
    a tension bow that is movably mounted in a direction of travel (V), to which tension bow the shading length is fastened,
    a drive mechanism that can be operated by a drive motor, said drive mechanism being designed to move the tension bow back and forth between a first end position (P1) in which the shading length is rolled up, and a second end position (P2) in which the shading length is unrolled at least partially,
    a control unit for activating the drive motor,
    wherein the shading device comprises at least one opposing force element for restricting a traveling movement of the tension bow,
    wherein the control unit is designed to activate the drive motor based on a drive torque of the drive motor when the tension bow reaches an end position (P1, P2) defined by the opposing force element, and wherein the control unit is configured to compare a determined drive torque with a predetermined limit drive torque and to switch off the drive motor or to reverse the drive direction of the drive motor if the determined drive torque exceeds the predetermined limit drive torque.

2. The shading device as claimed in claim 1, wherein the opposing force element defines the second end position (P2), wherein the shading length is designed to shade the light-permeable and/or open area of the vehicle roof in the second end position (P2) of the tension bow.

3. The shading device as claimed in claim 1 wherein the opposing force element is configured as a stop element which is arranged at one end of a lateral guide which guides the tension bow in the direction of travel (V).

4. The shading device of claim 1, wherein the control unit is designed to activate the drive motor based on a drive torque of the drive motor, in such a manner that the drive direction of the drive motor reverses when the tension bow reaches an end position (P1, P2) defined by the opposing force element to bring about a load-relief movement of the tension bow.

5. The shading device of claim 1, wherein the control unit is designed to detect a motor current of the drive motor and to determine a drive torque of the drive motor based on the motor current detected.

6. The shading device of claim 1, wherein the control unit is designed to determine a limit drive torque from previous traveling movements of the tension bow.

7. The shading device of claim 6, wherein the limit drive torque is smaller than, or equal to, an anti-trap protection torque for protecting a human body part from becoming trapped by the traveling movement of the tension bow.

8. The shading device of claim 1, wherein the control unit is designed to detect a travel time of the tension bow and, based on the detected travel time to calculate or estimate a position of the tension bow.

9. A roof arrangement for a vehicle roof, comprising a shading device as claimed in claim 1, wherein the roof arrangement comprises:
    a roof element configured to be adjusted by a drive motor for covering a roof opening in the vehicle roof,
    a roof adjustment mechanism for adjusting the roof element,
    wherein the control unit is designed to activate the roof adjustment mechanism of the roof element.

10. The roof arrangement as claimed in claim 9, wherein a drive motor for the shading device and the drive motor for the roof adjustment mechanism are connected to the control unit.

11. The roof arrangement as claimed in claim 9, wherein the control unit has a plug-type connection by means of which said control unit can be connected to the drive motor.

12. A control method for a shading device of claim 1 or for a roof arrangement having a shading device for a vehicle roof as claimed in claim 9, wherein the control method comprises the following steps:
    operation of a drive mechanism by activating a drive motor by means of a control unit, in order to move a tension bow of a shading device back and forth between a first end position (P1) and a second end position (P2), wherein a shading length that can be rolled up and is fastened to the tension bow for shading a light-permeable and/or open area of the vehicle roof is rolled up in the first end position (P1) and at least partially unrolled in the second end position (P2);
    determination of a drive torque of the drive motor, when the tension bow reaches an end position (P1, P2);
    activation of the drive motor by the control unit based on the determined drive torque of the drive motor.

13. The control method as claimed in claim 12, further comprising activation of the drive motor for reversing the drive direction of the drive motor, based on the drive force of the drive motor which has been determined, in order to bring about a load-relief movement of the tension bow.

14. The control method as claimed in claim 12, further comprising detection of a motor current of the drive motor when the tension bow reaches the end position (P1, P2) defined by the opposing force element, and determination of a drive torque of the drive motor based on the motor current detected wherein the drive motor is switched off or activated in order to reverse the drive direction if the drive torque that has been determined exceeds the limit drive torque.

15. The shading of claim 1, wherein the control unit is designed to determine a limit drive torque from recorded time profiles of the motor current and/or the drive torque.

16. The shading device of claim 1, wherein the control unit is designed to detect a travel time of the tension bow and, based on a rated speed of the drive motor, to calculate or estimate a position of the tension bow.

17. The roof arrangement of claim 9, wherein the roof element is light-permeable roof element.

18. The control method as claimed in claim 12, further comprising detection of a motor current of the drive motor when the tension bow reaches the end position (P1, P2) defined by the opposing force element, and determination of a drive torque of the drive motor based on comparison of the drive torque determined with a predetermined limit drive torque, wherein the drive motor is switched off or activated in order to reverse the drive direction if the drive torque that has been determined exceeds the limit drive torque.

19. A shading device for a vehicle roof, comprising:
    at least one shading length that can be rolled up for shading a light-permeable and/or open area of the vehicle roof,
    a tension bow that is movably mounted in a direction of travel (V), to which tension bow the shading length is fastened, a drive mechanism that can be operated by a drive motor, said drive mechanism being designed to move the tension bow back and forth between a first end position (P1) in which the shading length is rolled up, and a second end position (P2) in which the shading length is unrolled at least partially, a control unit for activating the drive motor, wherein the shading device comprises at least one opposing force element for restricting a traveling movement of the tension bow, wherein the control unit is designed to activate the drive motor based on an opposing force and/or a drive torque of the drive motor when the tension bow reaches an end position (P1, P2) defined by the opposing force element, wherein the tension bow or the opposing force element include a force sensor to detect the opposing force, wherein the control unit is connected to the force sensor and configured to evaluate a detected opposing force and to compare it with a predetermined limit stop force.

* * * * *